J. HARVAT
COMBINED THRASHER AND CLOVER HULLER.
APPLICATION FILED JUNE 26, 1920.
1,416,820.
Patented May 23, 1922.
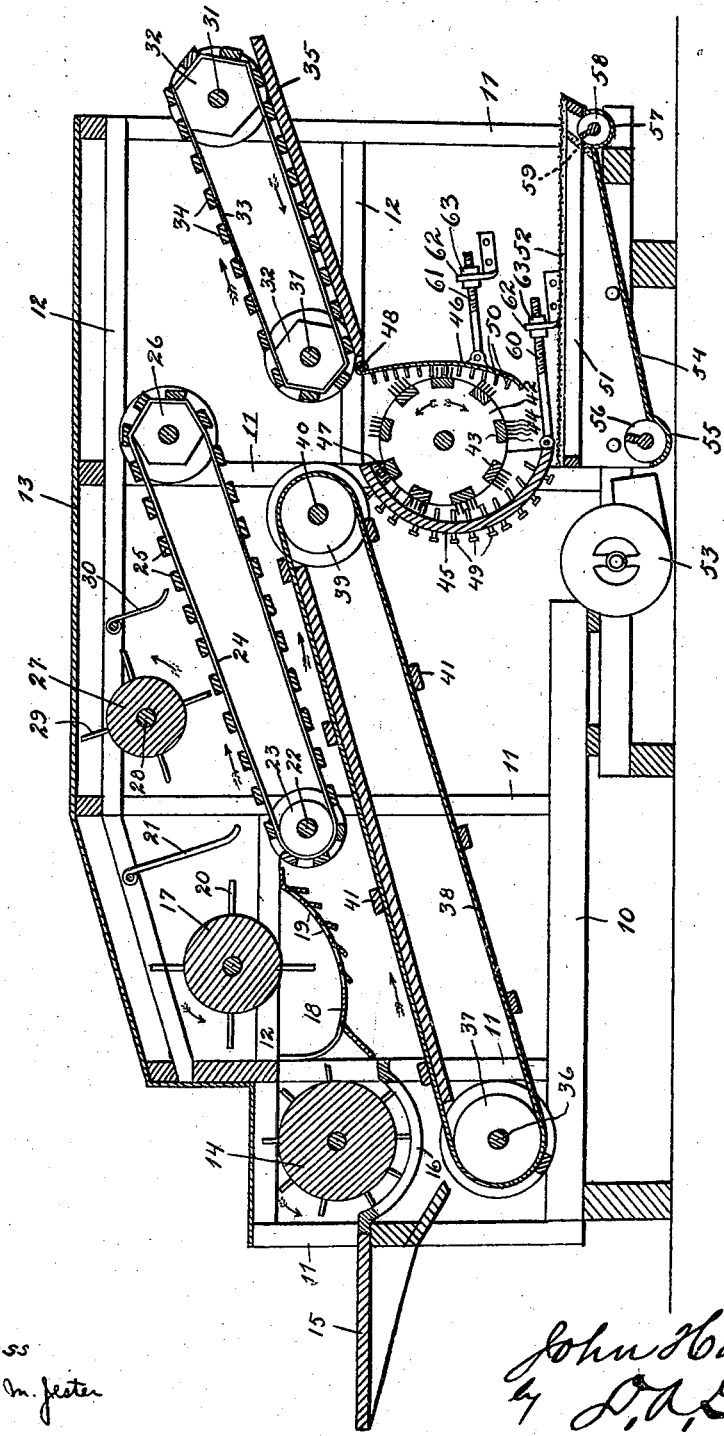

UNITED STATES PATENT OFFICE.

JOHN HARVAT, OF EASTMAN, WISCONSIN.

COMBINED THRASHER AND CLOVER HULLER.

1,416,800.　　Specification of Letters Patent.　Patented May 23, 1922.

Application filed June 26, 1920. Serial No. 392,125.

*To all whom it may concern:*

Be it known that I, JOHN HARVAT, a citizen of the United States, residing at Eastman, in the county of Crawford and State of Wisconsin, have invented certain new and useful Improvements in Combined Thrashers and Clover Hullers, of which the following is a specification.

This invention relates to thrashing machines and has for its object the provision of a device of this character which is adapted either for thrashing grain or for hulling clover, the essential feature being the provision of a hulling cylinder with which are associated two concaves, one having smaller teeth than the other and the cylinder being capable of being rotated in one direction for carrying out thrashing action and in the other direction for effecting hulling of clover.

An important object is the provision of a novel arrangement of rakers and conveyors which will efficiently conduct heads of grain to the hulling cylinder while the stems or stalks are carried along and discharged in the usual manner.

A further object is the provision of a device of this character in which the hulling cylinder is of unusual formation, being formed of a plurality of bars each carrying several series of teeth cooperating with the teeth or spikes of the concaves.

An additional object is the provision of a device of this character which will be comparatively simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawing in which—

The figure shows a longitudinal sectional view through a thrashing machine constructed in accordance with my invention.

Referring more particularly to the drawing, I have shown the device as comprising a supporting frame including lower sills 10, uprights 11, and upper sills 12. The top part of the frame-work is sheathed, as indicated at 13, in the usual manner so as to form a closed casing.

Suitably journaled at the front end of the frame is a cylinder 14 of conventional type and located adjacent the feed table 15 and operating in conjunction with a concave 16. Located rearwardly of the cylinder 14 and at a higher level is a raker roller 17 associated with a concave 18 formed, as shown, to provide a plurality of openings 19 through which grain may drop when knocked off by the arms 20. The usual pivoted member 21 is carried by the upper frame bars rearwardly of the roller 17.

Journaled transversely of the frame rearwardly of and below the roller 17, is a transverse shaft 22 carrying flanged rollers 23 about which are trained belts 24 carrying cross slats 25. The belts 24 are in turn trained about a pair of flanged polygonal heads 26 and the purpose of the angularity thereof is to prevent slippage of the belt 24. The conveyor structure is designed to carry the material to be thrashed from the roller 17 to another roller 27 of similar construction and carried upon a transverse shaft 28. This roller also operates to kick the material along the conveyor 24 and the arms 29 operate to break open the grain heads. The usual pivoted plate 30 is located rearwardly of the roller 27.

Located at the rear end of the device is a conveyor structure including a pair of shafts 31 which carry polygonal heads 32 about which is trained an endless belt 33 carrying slats 34, the lower stretch of the belt bearing upon the guide plate 35. The purpose of this conveyor structure is to receive the straw passing from the belt 24 and to discharge the same at the rear end of the machine in the usual manner.

Located at the lower front portion of the frame is a transverse shaft 36 carrying a roller 37 about which is trained a preferably canvas apron 38 which is also trained about a roller 39 carried by a shaft 40. This conveyor structure is inclined upwardly and rearwardly and the canvas apron is provided with a plurality of slats 41. The purpose of this apron is to catch the grain knocked off by the raker members 17 and 27 and falling through the concaves 16 and 18 and through the uppermost slatted conveyor.

Journaled transversely of the frame toward the rear portion thereof and below the roller 39, is a hulling cylinder 42 which includes a plurality of bars 43 each of which carries five series of teeth 44 which are preferably rather small. Associated with this cylinder are forward and rear concaves 45 and 46, respectively, which are pivotally mounted, as shown at 47 and 48, respectively. The concave 45 is designed to be used when the machine is employed for hulling clover and this concave is provided with series of spikes 49 extending throughout its area and designed to cooperate with the teeth 44. The rear concave 46 carries a plurality of teeth 50 which are smaller than the spikes 49 and which are intended to be used when the device is employed for thrashing grain.

Located at the rear portion of the frame at the bottom thereof, is a frame 51 carrying a wire screen 52 which is so positioned as to receive clover or grain, as the case may be, discharged from between the concaves 45 and 46. If found advisable, I may provide a blower of conventional pattern, indicated at 53, for the purpose of further cleaning the material dumped onto the screen.

The bottom 54 of the screen frame is inclined, as shown, and its lower end leads into a trough 55 within which is a screw conveyer 56 which leads to any suitable sacker, not shown. At the upper end of the inclined bottom 54 is a trough 57 within which is a screw conveyer 58 which may also lead to a separate sacker or the like, not shown. If desired the trough 57 may be covered with a board or plate 59 indicated by dotted lines. Grain falling through the screen 52 will be separated, the lighter kernels being blown into the trough 57 and the heavier kernels sliding down the incline into the trough 55. When the cover 59 is in place there is of course no separation as all the grain will eventually pass into the trough 55.

The belt for driving the various rollers and conveyors is not shown as such would be conventionally arranged. It is, however, to be stated that when the device is arranged for use in thrashing grain the cylinder 43 must rotate forwardly in cooperation with the concave 46 and when it is desired to hull clover the belt or other mechanism for rotating the cylinder 42 must be reversed so as to cause it to revolve in the opposite direction in cooperation with the spikes 49.

It is intended, of course, that only one concave be in operative relation to the cylinder at a time. It is therefore necessary to hold one concave in active and the other in inactive position. This might be accomplished in a variety of ways, though for purposes of illustration I have shown threaded rods 60 and 61 pivotally connected with the concaves 45 and 46, respectively, and passing through brackets 62 secured within the thrasher, the rods carrying adjusting nuts 63 by means of which the rods may be moved to move and hold either concave in co-operative relation to the cylinder.

From the foregoing description and a study of the drawing it will be apparent that I have thus provided a simply constructed and very easily operated convertible thrashing machine and clover huller which combines in one device all the advantages of two such separate machines without in any way sacrificing efficiency.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

In a thrashing machine including a casing and conveyors therein, a hulling cylinder located between and below the adjacent ends of the conveyors, a pair of concaves pivoted at their upper corners to the casing and arranged at opposite sides of the cylinder, and means for holding either concave in operative and the other in inoperative relation to the cylinder comprising a bolt pivotally connected with the lower edge of each concave, a bracket secured within the casing and through which the bolt passes, and adjusting nuts on the bolt engaging both sides of the bracket.

In testimony whereof I affix my signature.

JOHN HARVAT.